(12) United States Patent
Thomson (10) Patent No.: US 10,627,135 B2
(45) Date of Patent: Apr. 21, 2020

(54) MODULAR SOLAR-ENERGY AND RAINWATER COLLECTION APPARATUS

(71) Applicant: INTUITIVE DESIGNS (JERSEY) LTD, St Peter (JE)

(72) Inventor: Wendy Thomson, St Peter (JE)

(73) Assignee: INTUITIVE DESIGNS (JERSEY) LTD, St. Peter (JE)

( * ) Notice: Subject to any disclaimer, the term of this patent is extended or adjusted under 35 U.S.C. 154(b) by 0 days.

(21) Appl. No.: 16/075,156

(22) PCT Filed: Feb. 2, 2017

(86) PCT No.: PCT/GB2017/050252
§ 371 (c)(1),
(2) Date: Aug. 3, 2018

(87) PCT Pub. No.: WO2017/134435
PCT Pub. Date: Aug. 10, 2017

(65) Prior Publication Data
US 2019/0056149 A1 Feb. 21, 2019

(30) Foreign Application Priority Data

Feb. 3, 2016 (GB) .................................. 1601903.6

(51) Int. Cl.
*F24S 40/44* (2018.01)
*E03B 3/03* (2006.01)
(Continued)

(52) U.S. Cl.
CPC ................ *F24S 40/44* (2018.05); *E03B 3/03* (2013.01); *F24S 10/70* (2018.05); *F24S 60/30* (2018.05);
(Continued)

(58) Field of Classification Search
CPC . F24S 40/44; F24S 10/70; F24S 60/30; H02S 20/22; H02S 20/24; E03B 3/03
See application file for complete search history.

(56) References Cited

U.S. PATENT DOCUMENTS 6,436,283 B1 8/2002 Duke
6,606,823 B1 8/2003 McDonough et al.
(Continued)

FOREIGN PATENT DOCUMENTS

CN 102505811 A 6/2012
CN 204498053 U 7/2015
(Continued)

OTHER PUBLICATIONS

Search Report under Section 17, GB Patent Application No. 1020933.6 dated Mar. 15, 2011.
(Continued)

*Primary Examiner* — Jayne L Mershon
(74) *Attorney, Agent, or Firm* — Millman IP Inc.

(57) ABSTRACT

A modular solar-energy and rainwater collection apparatus (10) comprising: a collector mount (12) adapted both for securement to a building and to an angularly-adjustable support (110); a plurality of rainwater collectors (14) supportable by the collector mount (12), each rainwater collector (14) having a base (18), and at least one solar-cell retainer (20), for securing at least one solar cell (22) relative to the base (18) of at least one said rainwater collector (14); and connection means (16), for rigidly interconnecting a plurality of like rainwater collectors (14) so that the bases (18) are in abutted liquid communication with each other thus forming a modular rainwater collection area (36).

12 Claims, 5 Drawing Sheets

(51) Int. Cl.
*F24S 10/70* (2018.01)
*F24S 60/30* (2018.01)
*H02S 20/24* (2014.01)
*H02S 20/22* (2014.01)
*F24S 20/00* (2018.01)

(52) U.S. Cl.
CPC ............ *H02S 20/22* (2014.12); *H02S 20/24* (2014.12); *F24S 2020/17* (2018.05); *Y02A 20/106* (2018.01); *Y02A 20/108* (2018.01); *Y02B 10/12* (2013.01); *Y02B 10/20* (2013.01); *Y02E 10/44* (2013.01)

(56) References Cited

U.S. PATENT DOCUMENTS

| | | | | |
|---|---|---|---|---|
| 8,991,117 | B1* | 3/2015 | Walker | H01L 31/052 52/173.3 |
| 2005/0133082 | A1* | 6/2005 | Konold | H02S 40/44 136/246 |
| 2010/0154786 | A1 | 6/2010 | Li | |
| 2011/0248137 | A1 | 10/2011 | Barba | |
| 2013/0283707 | A1* | 10/2013 | Ratajac | E04D 13/076 52/12 |
| 2016/0017609 | A1* | 1/2016 | Bottin | E04D 13/04 52/302.1 |

FOREIGN PATENT DOCUMENTS

| | | |
|---|---|---|
| DE | 19529351 A1 | 2/1997 |
| EP | 2243901 A2 | 10/2010 |
| GB | 2486263 A | 6/2012 |
| JP | 790939 A | 4/1995 |
| WO | 2005/034611 A1 | 4/2005 |
| WO | 2012076909 A2 | 6/2012 |
| WO | WO2012076909 * | 6/2012 |
| WO | 2012110505 A1 | 8/2012 |

OTHER PUBLICATIONS

Search Report under Section 17(5), GB Patent Application No. 1601903.6 dated Aug. 1, 2016.
International Search Report and Written Opinion for PCT/GB2017/050252 dated Apr. 19, 2017.
Examination Report under Section 18(3) for GB Patent Application No. 1601903.6 dated May 25, 2018.
Examination Report under Section 18(3) for GB Patent Application No. 1311577.9 dated Apr. 22, 2015.
Examination Report under Section 18(3) for GB Patent Application No. 1311577.9 dated Jan. 6, 2016.
Examination Report under Section 18(3) for GB Patent Application No. 1311577.9 dated May 31, 2016.
International Preliminary Report on Patentability for PCT/GB2011/052460 dated Jun. 12, 2013.
International Search Report for PCT/GB2011/052460 dated May 25, 2012.

* cited by examiner

MODULAR SOLAR-ENERGY AND RAINWATER COLLECTION APPARATUS

The present invention relates to a solar-energy and rainwater collection apparatus and, more particularly but not necessarily exclusively, to a portable, modular apparatus for collecting solar-energy and rainwater.

It is known to collect water and solar-energy in combined apparatus. Such devices are commonly used in both commercial and domestic applications.

As worldwide energy consumption increases, there has been an increased emphasis on the development of alternative energy sources. Solar power systems are non-polluting and offer significant protection of the environment. As such, they are seen as an attractive resource to be utilised in order to achieve a sustainable future. Whilst permanent installations can be seen as relatively expensive, the costs can often be justifiable, as they are amortised over the long lifetime of such a system.

Additionally, almost one quarter of the world's population faces economic water shortage. Accordingly, similar to the need for developing renewable energy sources, there has been an increasing awareness of the necessity to develop effective means of harvesting water from rain and related precipitation Water and energy production are of critical importance in disaster zones. With 218 million people affected by natural disasters on average per annum, between 1994 and 2013, a need frequently arises for temporary solutions. Installing a system that utilises expensive structures and installation methods cannot be justified on a temporary basis. Temporary systems may be utilised to great advantage in such situations.

As such, it would be highly desirable to develop an easily transportable modular system that is configurable to meet the requirements of the user, but still provides the benefits of a power generating system of existing structures. There is a crucial as of yet unmet need for such an apparatus that could be easily and efficiently deployed in any space required, while also providing the user with the option of increasing the size of the unit as required. Finally, it would be preferable that the apparatus doubles as a means for conveniently collecting and storing potable water from precipitation.

It is an object of the present invention to provide a modular solar-energy and rainwater collection apparatus so as to obviate one or more of the above-mentioned problems.

According to a first aspect of the invention there is provided a modular solar-energy and rainwater collection apparatus comprising: a collector mount adapted both for securement to a building and to an angularly-adjustable support; a plurality of rainwater collectors supportable by the collector mount, each rainwater collector having a base, and at least one solar-cell retainer, for securing at least one solar cell relative to the base of at least one said rainwater collector; and connection means, for rigidly interconnecting a plurality of like rainwater collectors so that the bases are in abutted liquid communication with each other thus forming a modular rainwater collection area.

The modular solar-energy and rainwater collection apparatus is advantageous as an easily transportable modular system that collects both solar energy and rainwater. The modularity of the apparatus means that the apparatus is easily configurable to meet the requirements of the user, yet both efficient and compact. The apparatus beneficially provides the benefits of existing structures, notably, the ability to both collect rainwater and generate power from solar energy, whilst having the capability to use the generated power to heat the collected rainwater.

Each rainwater collector may have a discontinuous upstanding perimeter side wall. As such, preferably, the connection means may advantageously include at least one bridging infill element which interconnects at least parts of neighbouring side walls of two abutted rainwater collectors. The bridging infill element may be a planar or substantially planar member having a first bridging connector part at each end portion of the planar member for engaging complementary second bridging connector parts on the neighbouring side walls of abutted rainwater collectors.

Beneficially, the infill elements assist with the modularity of the device. Any number of like rainwater collectors may be interconnected by the bridging infill elements, thereby enabling the modular solar-energy and rainwater collection apparatus to be configurable to the requirements of the user.

Preferably, the modular solar-energy and rainwater collection apparatus may further comprise at least one corner infill element. Further, each corner infill element may have a first wall connector part at each end portion of the corner infill element for engaging complementary second wall connector parts on the discontinuous upstanding perimeter side wall of each rainwater collector. Advantageously, the at least one bridging infill element and/or the at least one corner infill element may complete a perimeter boundary of the modular rainwater collection area. Additionally, the corner infill elements may define the vertices of the modular solar-energy and rainwater collection apparatus.

The corner infill elements are advantageous in that, once the size and orientation of the modular solar-energy and rainwater collection apparatus is determined by the user, the or each bridging infill element, together with the or each corner infill element, may complete a perimeter boundary of the modular rainwater collection area, and may therefore assist in preventing or limiting any rainwater collected from unintentionally escaping.

Preferably, at least one said bridging infill element or corner infill element may include a discharge aperture for the discharge of runoff precipitation accumulated on the modular rainwater collection area.

Beneficially, this enables an outlet for rainwater collected on the modular rainwater collection area to be provided. The rainwater can then be directed as required after passing through the discharge aperture. Providing a discharge aperture in at least one said bridging infill element or corner infill element is advantageous in maintaining the modularity and flexibility of the modular solar-energy and rainwater collection apparatus, whilst enabling rainwater to be discharged from a preferred location.

The base and discontinuous perimeter side wall of each rainwater collector may form a tray, each tray having a continuous base for the or each associated solar cell to lie thereon. Further, the modular rainwater collection area may be a perimeter gutter with side walls. Preferably each rainwater collector may include at least one solar-cell support for supporting the or each solar cell in a spaced apart relationship with the base of an associated rainwater collector.

Advantageously, this provides that the or each solar cell is not in contact with the base of an associated rainwater collector and consequently, not in communication with the rainwater collection area, allowing for a greater area to be utilised for the collection of precipitation and preventing any overflow of liquid back on to the surface of the solar cell.

Preferably, the solar-cell retainer may be a solar-cell frame, overlapping the or each associated solar-cell and engageable with the base of the rainwater collector. Most preferably, an upper surface of the solar-cell retainer includes an inwardly-directed slope for runoff precipitation onto an associated solar cell.

Further, the solar-cell retainer may include a filter for filtering rainwater running from the or each associated solar cell to the modular rainwater collection area. Preferably, the filter may prevent or limit debris from passing to the modular rainwater collection area. Optionally, the filter may be a castellated edge of the solar-cell retainer.

Beneficially, this provides that any precipitation is directed onto an associated solar cell, from which it will pass through a filter to the modular rainwater collection area. Including a filter assists in preventing or limiting debris flowing to the modular rainwater collection area and assists in preventing sediment building up and clogging the apparatus. Additionally, precipitation directed onto an upper surface of the solar cell advantageously assists with self-cleaning of the solar cell.

Further, an upper surface of the solar-cell retainer may include at least one conduit mount for positively engaging at least one liquid conduit. Furthermore, each conduit mount may include two conduit retainers for positively engaging two liquid conduits in side-by-side relationship, the conduit mount extending laterally between an inner perimeter sidewall and an outer perimeter sidewall of the solar-cell retainer. Preferably, at least one liquid conduit may be supported by the rainwater collectors. Most preferably, the or each said liquid conduit may be positively engaged with the or each solar-cell retainer.

Advantageously, this provides that the or each liquid conduit may thereby be positively supported by the liquid conduit mounts in side by side relationship on the solar-cell retainer.

The modular solar-energy and rainwater collection apparatus may further comprise a rainwater accumulator for storing accumulated runoff rainwater discharged from the modular rainwater collection area. Preferably, the or each liquid conduit may be in liquid communication with the rainwater accumulator, and include pump means adapted to pump runoff rainwater from the rainwater accumulator through the liquid conduit. Most preferably, the modular solar-energy and rainwater collection apparatus may include a heated-water reservoir for receiving runoff rainwater which is heated when pumped through the liquid conduit supported by the rainwater collectors.

Beneficially, this system provides that runoff rainwater collected in the modular rainwater collection area may be circulated in the or each liquid conduit. Advantageously, runoff rainwater may then be heated by solar energy before being received by the heated-water reservoir.

Optionally, the modular solar-energy and rainwater collection apparatus may further comprise an electricity supply for powering the apparatus. Additionally, the modular solar-energy and rainwater collection apparatus may further include a UV purification device arranged to purify the rainwater collected by the apparatus by UV radiation.

Advantageously, the electricity supply may supplement the or each solar cell converting solar power into electricity and assist with the operation of the pump, enabling the apparatus to be used to circulate and heat runoff rainwater even when solar energy is not available. The UV purification device permits the runoff rainwater to be treated and assists in killing bacteria in the runoff rainwater.

Further, the angularly-adjustable support may have first and second elements, the first element being adapted to engage the collector mount, and the second element being adapted for mounting on a support surface. Preferably, the first and second elements may be frames. The first and second elements may also be hingeably interconnected. Beneficially, the first and second elements may be adapted to house one or both of the rainwater accumulator and heated-water reservoir, between the first and second elements.

This structure is advantageous in assisting with the portability of the device. The apparatus can be mounted on the angularly-adjustable support with the frame being adaptable to house one or both of a rainwater accumulator and a heated-water reservoir. Therefore, the apparatus can be deployed to any location and can be used in disaster areas or where temporary relief is required. The angularly-adjustable support is beneficial in making the device more adaptable than existing solutions as no sloped or pitched surface is required, due to the support being capable of providing the required pitch or angle.

According to a second aspect of the present invention, there is provided a modular solar-energy and rainwater collection apparatus comprising: a collector mount adapted both for securement to a building and to an angularly-adjustable support; at least one solar cell for collecting solar energy; and a plurality of rainwater collectors supportable by the collector mount, each rainwater collector having: a base; and at least one solar-cell retainer, for securing at least one solar cell relative to the base of at least one said rainwater collector; and connection means for rigidly interconnecting a plurality of like rainwater collectors so that the bases are in abutted liquid communication with each other thus forming a modular rainwater collection area.

The invention will now be more particularly described, by way of example only, with reference to the accompanying drawings, in which.

Figure 1:
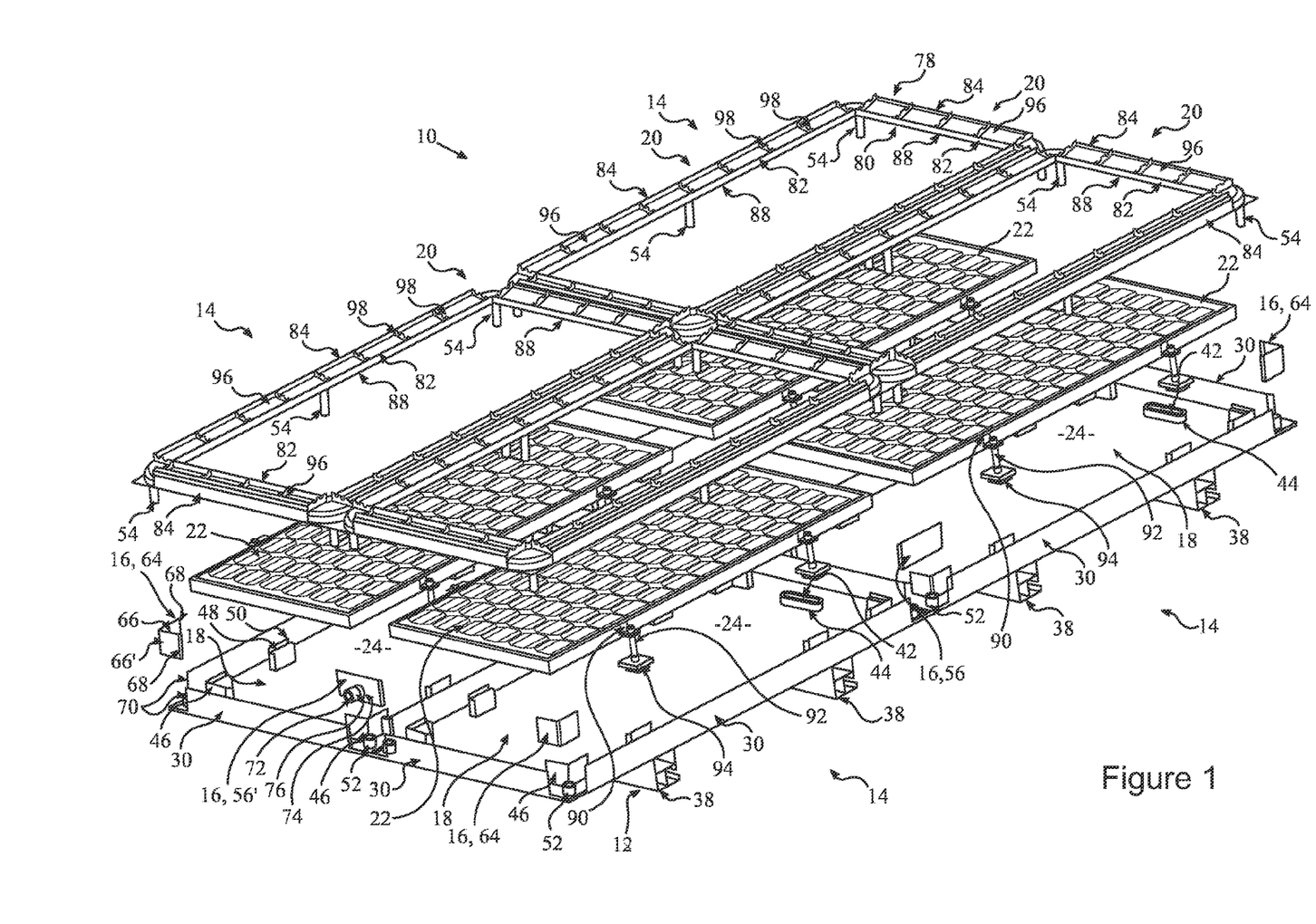
FIG. 1 shows an exploded perspective view from above of a modular solar-energy and rainwater collection apparatus, in accordance with the invention, including four solar cells, each solar cell locatable in an associated rainwater collector.

Referring to the drawings there is shown in FIG. 1, a modular solar-energy and rainwater collection apparatus 10, which comprises a collector mount 12, a plurality of rainwater collectors 14 and a connection means 16.

Each rainwater collector 14 has a base 18 and a solar-cell retainer 20 for securing at least one associated solar cell 22 with the base 18 of the rainwater collector 14. Preferably, each rainwater collector 14 is rectangular, or substantially rectangular, and may secure one associated solar cell 22, as shown throughout the drawings, although it is appreciated that each rainwater collector may be adapted to secure a plurality of solar cells in different configurations than those depicted.

The base 18 of each rainwater collector 14 is preferably formed of moulded plastics, and may further be formed as a tray, having flat or substantially flat planar upper and lower surfaces 24, 26, four edges 28a, 28b, 28c, 28d and a discontinuous upstanding perimeter side wall 30, perpendicular to the flat planar upper surface 24, at or adjacent to the four edges 28a, 28b, 28c, 28d.

Whilst in this embodiment, each rainwater collector 14 is shown as rectangular, or substantially rectangular, other shapes may be used, providing the modular solar-energy and rainwater collection apparatus 10 retains its modularity. Additionally, whilst in this embodiment the discontinuous upstanding perimeter side wall 30 is formed as part of the base 18 of each rainwater collector 14, other designs, configurations or embodiments are possible. For example, the discontinuous upstanding perimeter side wall may instead be formed as part of the solar-cell retainer, or may instead be formed of multiple detachable parts.

Figure 4:
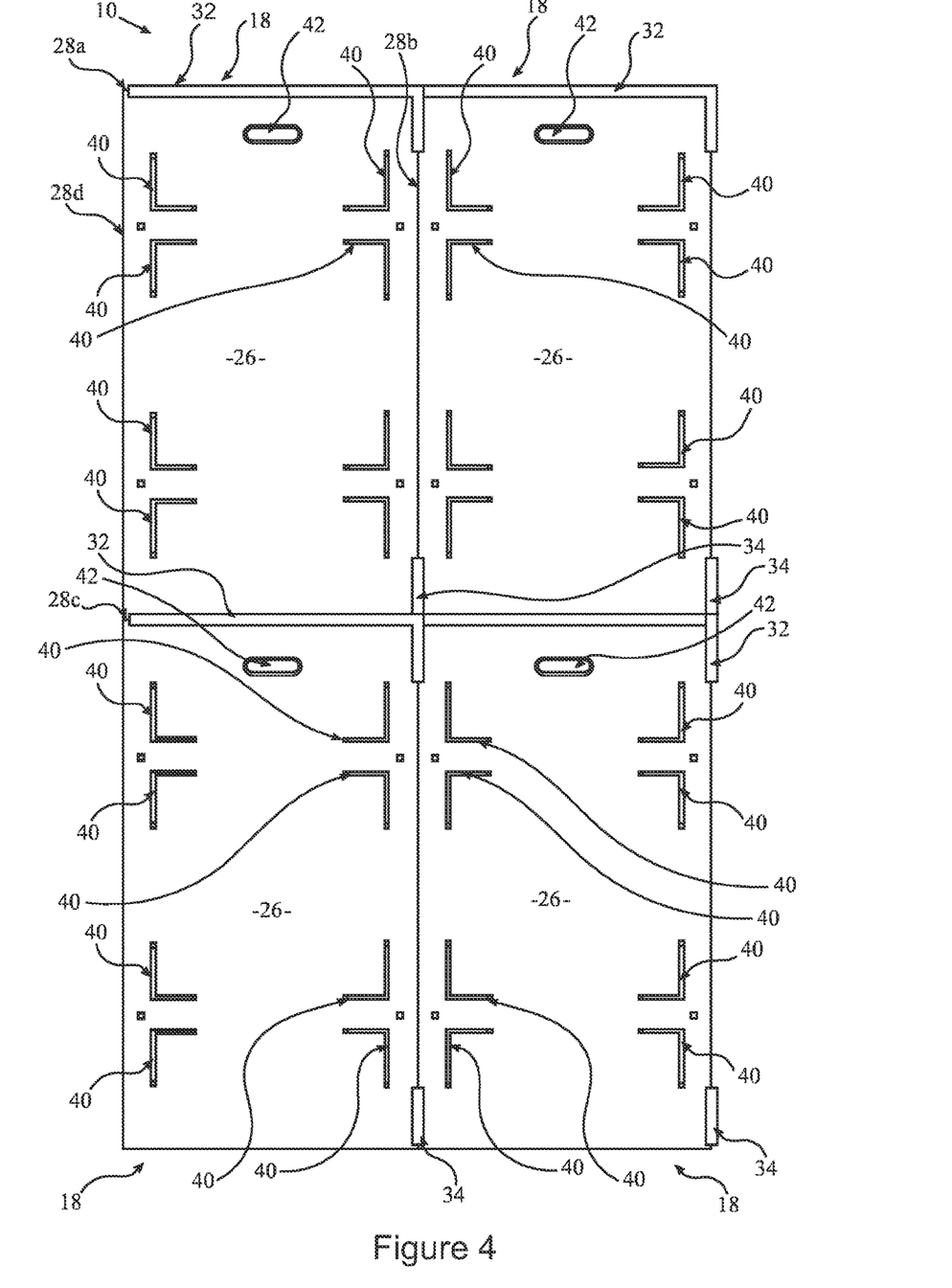
FIG. 4 shows a view from below of the bases of the rainwater collectors shown in FIG. 1.

To improve the rigidity of the base 18 of each rainwater collector 14, and to ensure a continuous connection between rainwater collectors 14, each base 18 may further comprise at least one flange, lip or seal on the lower surface 26. In this case, the lower surface 26 of the base 18 has a lip 32, appended across at least part of first and second adjacent edges 28a, 28b and a vertex of the base 18, and a corresponding seal 34, appended along part of the second edge 28b of the base 18, as best illustrated in FIG. 4. Therefore, when the bases 18 of the rainwater collectors 14 are abutted, a continuously connected modular rainwater collection area 36 is formed by the upper surfaces 24 of the bases 18.

Additionally and/or alternatively, the modular rainwater collection area may be formed of a perimeter gutter with side walls.

The collector mount 12 is preferably formed of a plurality of fixing rails 38. The fixing rails 38 may be formed of extruded aluminium and cut to the required length. In the depicted arrangement, the requisite length may be, or substantially be, that of the length or width of the modular rainwater collection area 36. In addition, the fixing rails may be formed from a variety of different materials, such as any metal or composite material, or plastics. The fixing rails may also be provided in differing configurations, provided they provide the requisite support to mount the apparatus. For example, single layered and/or double layered support rails may be used, and these may be horizontal or vertical or used together. Other types of collector mounts may also be used.

To improve the ease of attaching the connector mount to the base 18 of each rainwater collector 14, the lower surface 26 of the base 18 may also have raised guides 40, spaced so as to direct the fixing of the fixing rails 38 to the base 18. In this embodiment, the raised guides 40 are spaced so as to accommodate the fixing rails 38 attached either laterally or longitudinally across the underside of the modular rainwater collection area 36. In other embodiments, there may be additional and/or alternative raised guides. Alternatively, some or all of these may be omitted.

The base 18 of each rainwater collectors may also include an opening 42 designed to act as a handhold to assist in lifting the base 18. As best illustrated in FIG. 1, each opening 42 has a raised rim 44 adjacent to the upper surface 24 of the base 18, so as to prevent or limit collected rainwater from escaping through the opening 42.

Whilst in this embodiment the openings are depicted as being elliptical in shape, any such alternative shape may be used instead providing it is capable of acting as a handle. In addition and/or alternatively, a grip, handle, ridge or alternative handhold may be attached to the lower surface of the base to assist with the handling of the base. This handhold may also be omitted.

The upper surface 26 of the base 18 of each rainwater collector 14 may include at least one solar-cell support 46 for supporting an associated solar cell 22, preferably, in a spaced apart relationship with the base 18 of the associated rainwater collector 14. In this embodiment, the solar-cell support 46 is a discontinuous ledge forming a shoulder 48 upon which the solar cell 22 seats and is supported by an upright element 50 extending upwards beyond the shoulder 48 against which the solar cell 22 can be positioned and/or aligned.

While a specific embodiment of the solar-cell support is shown and described herein, it should be appreciated that this is not limited to any particular design, configuration or embodiment. For example, the solar-cell support could take the form of a continuous ledge, or clips attached to the interior of the discontinuous perimeter side wall which the associated solar cell may be engaged with. Furthermore, the apparatus may be provided with just one solar-cell support or more than that depicted and described.

Preferably, the upper surface 26 of the base 18 of each rainwater collector 14 includes at least one receiving element 52. Beneficially, the or each receiving element 52 positioned on the base 18 of each rainwater collector 14 will engage with a corresponding locating element 54 on the associated solar-cell retainer 20, so as to secure at least one solar cell 22 relative to the base 18 of at least one rainwater collector.

The receiving elements 52 are, in this case, circular, or substantially circular, upstanding wells, sized to match, or substantially match, the complementary locating elements 54. However, it should be appreciated that other kinds of receiving and locating elements may be utilised in addition and/or alternatively to the receiving elements 52 and complementary locating elements 54. For example tabs, slots, dimples, pins or other varieties of connectors may be used, such as a headed locking pin which may be dropped through respective apertures on the base and solar-cell retainer once aligned. In addition the receiving elements may be located on the solar-cell retainer and the locating elements on the base.

Figure 2:
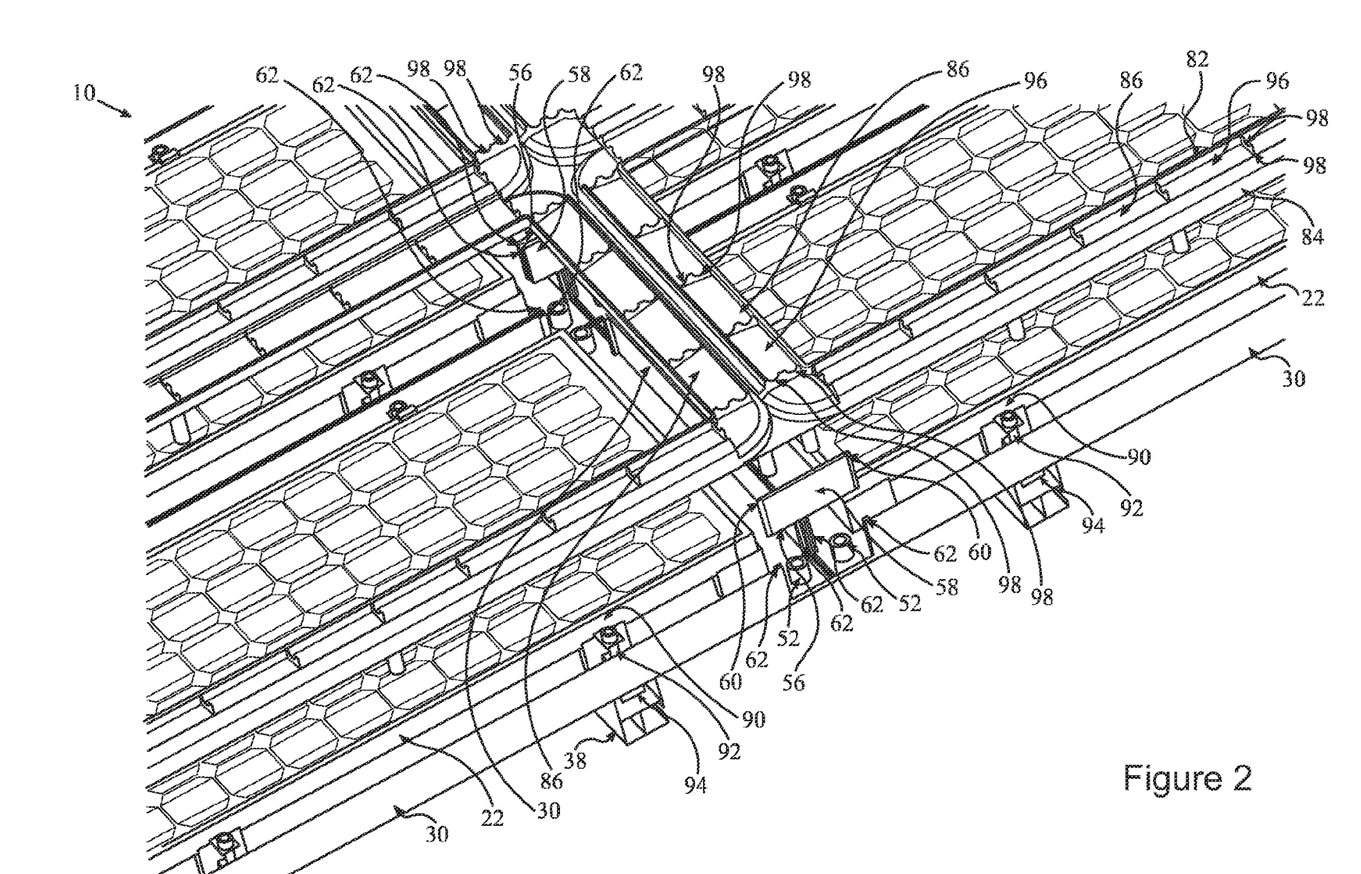
FIG. 2 is an enlarged view of a portion of FIG. 1, showing the connection means and clamping system in more detail.

Preferably, at least one bridging infill element 56, 56' interconnects neighbouring side walls 30 of two abutted like rainwater collectors 14, as best depicted in FIG. 2. Each bridging infill element 56, 56' is a planar or substantially planar member 58 having a first bridging connector part 60 at each end. Advantageously, the first bridging connector parts 60 engage with complementary second bridging connector parts 62 on the neighbouring side walls 30 of two abutted like rainwater collectors 14. Here, the first bridging connector parts 60 are received by the complementary second bridging connector parts 62 by sliding the bridging infill element 56, 56' into the gap left by neighbouring side walls 30 from above, so the bridging infill element 56, 56' interlocks with the neighbouring side walls 30. The bridging infill element 56, 56' is dimensioned such that it fits snugly into the gap left between two neighbouring side walls 30.

Whilst in this embodiment, a bridle joint is used, with each first bridging connector part 60 acting as a tenon and each second bridging connector part 62 acting as a mortise, it will be appreciated that other types of connectors and joints may be used in addition to and/or alternatively to the type described and depicted herein. For example, a snap-fit joint, dowel joint, finger joint, dovetail joint or splice joint may be used, as may a clasp or latch.

Figure 3:
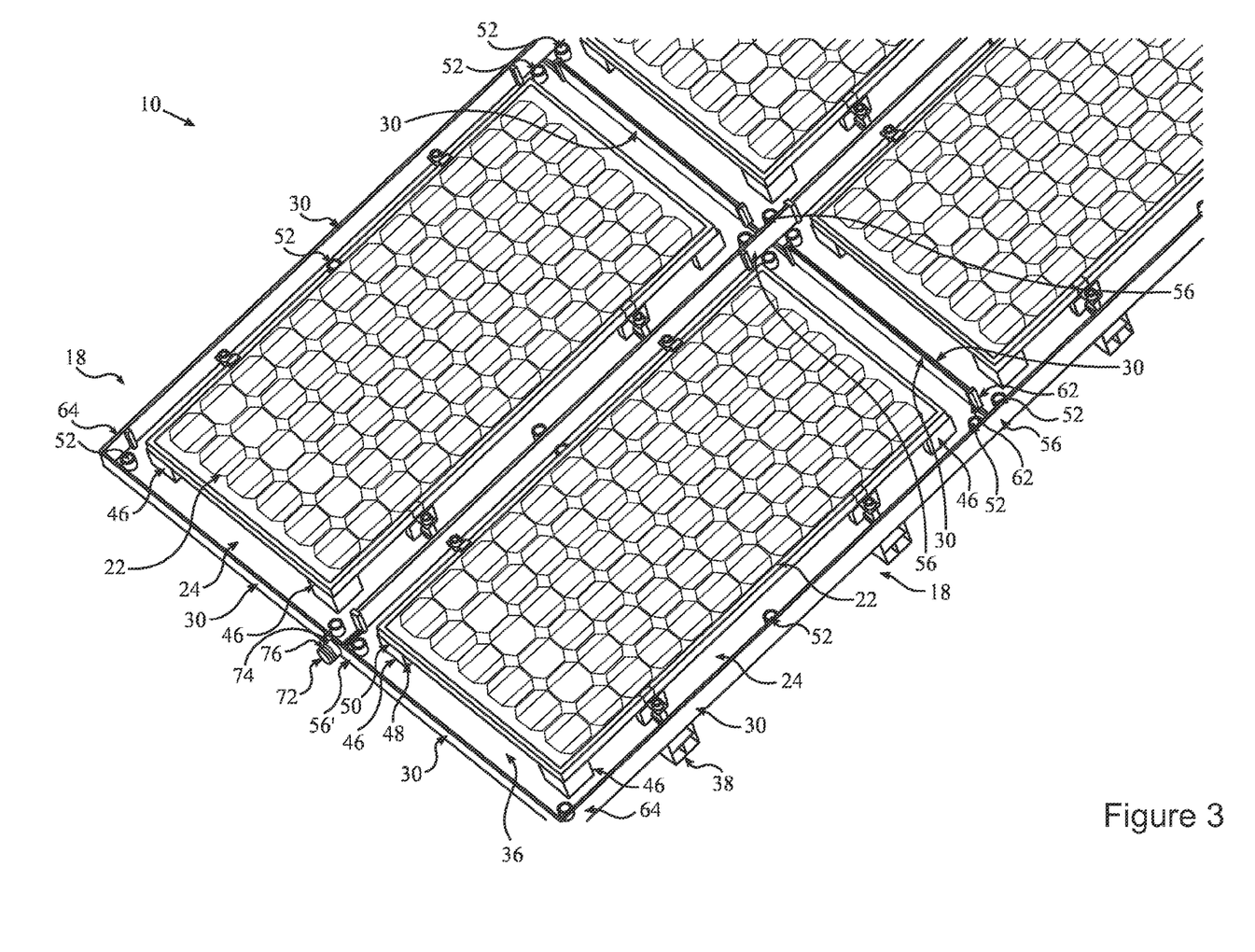
FIG. 3 shows a perspective view from above of the modular solar-energy and rainwater collection apparatus of FIG. 1, including the four solar cells locatable on an associated base of each rainwater collector, but omitting the solar-cell retainers.

Preferably, at least one corner infill element 64 interconnects perpendicular side walls 30 of a rainwater collector 14, as best depicted in FIGS. 2 and 3. Each corner infill element 64 is an 'L' shaped element formed of two planar or substantially planar sections 66, 66' which are, or are substantially, perpendicular to each other. Preferably, each corner infill element 64 is a single contiguous component, having a first wall connector part 68 at each end.

Advantageously, the first wall connector parts 68 engage with complementary second wall connector parts 70 on the perpendicular side walls 30 of a rainwater collector 14. Preferably, the second wall connector parts 70 are the same, or substantially the same, as the second bridging connector parts 62. The first wall connector parts 68 are received by the complementary second wall connector parts 70 by sliding the corner infill element 64 into the gap left by perpendicular side walls 30 from above, so the corner infill element 64 interlocks with the perpendicular side walls 30. Preferably, a bridle joint arrangement is again used, where each first wall connector part 68 acts as a tenon and each second wall connector part 70 acts as a mortise. The corner infill element is dimensioned such that it fits snugly into the gap left between perpendicular side walls 30, so four corner infill elements 64 may complete the discontinuous upstanding perimeter side wall 30 to make it continuous.

Further, a plurality of the at least one corner infill element 64 and the at least one bridging infill element 56, 56' may complete a perimeter boundary of the modular rainwater collection area 36, where the corner infill elements 64 define vertices of the modular solar-energy and rainwater collection apparatus 10.

As best illustrated in FIG. 3, beneficially, the bridging infill elements 56 can be used to construct channels to guide rainwater towards a discharge aperture 72 for the discharge of runoff precipitation accumulated in the modular rainwater collection area 36. In this embodiment, the discharge aperture 72 is provided in the bridging infill element 56', the bridging infill element 56' with the discharge aperture 72 therefore also acts a discharge port.

Advantageously, the bridging infill element 56' with the discharge aperture 72 allows for easy reorientation of the apparatus and provides that the modular solar-energy and rainwater collection apparatus 10 may be configured in both landscape and portrait orientation. The arrangement also enables a larger or smaller number of rainwater collectors 14 to be utilised, according to the requirements of the user, and orientated as necessary, by placing the bridging infill elements 56 and the bridging infill element 56' with the discharge aperture 72 in differing locations to construct channels as required to direct runoff precipitation towards the discharge aperture 72.

Whilst a specific embodiment of the modular solar-energy and rainwater collection apparatus 10 is shown and described herein, it will be appreciated that this is not limited to any particular design, configuration or embodiment. A discharge aperture may instead be provided in at least one corner infill element. Alternatively, there may be no discharge aperture provided in either the at least one bridging infill element or the at least one corner infill element and instead, at least one of either the at least one bridging infill element or the at least one corner infill element may be omitted resulting in a discontinuous perimeter boundary of the modular rainwater collection area through which rainwater may be discharged.

Although in this embodiment, the discharge aperture 72 comprises a nozzle 74 with a screw threaded attachment part 76 radiating outwards away from the discontinuous upstanding perimeter side wall 30, the discharge aperture may be provided in a suitable form other than this. For example, the discharge aperture may comprise drill hole passageways, or alternatively, a mesh, a grid or a spout may be utilised. In addition, the discharge aperture may be located off centre of the at least one bridging infill element or the at least one corner infill element, or in any other configuration, provided liquid may be discharged from the modular rainwater collection area.

In this embodiment, the solar-cell retainer 20 of each rainwater collector 14 is a frame with upper and lower surfaces 78, 80 and inner and outer perimeter sidewalls 82, 84. The lower surface 80 of each solar-cell retainer 20 includes at least one locating element 54, positioned so as to engage with a corresponding receiving element 52 on the associated base 18, so as to secure at least one solar cell 22 relative to the base of at least one rainwater collector 14.

It will be appreciated that the solar-cell retainer may be provided in a form other than that described. For example the solar cell retainer may not be a frame, but instead consist of a panel or series of panels, or an apertured cover, provided it acts to secure at least one solar cell relative to the base of at least one said rainwater collector.

The locating elements 54 are, in this case, circular, or substantially circular, posts, sized so as to be received by the complementary receiving elements 52 on the base 18 of the associated rainwater collector 14. It should be appreciated that other kinds of receiving and locating elements may be utilised in addition and/or alternatively to the receiving elements 52 and complementary locating elements 54, as hereinbefore described.

When aligned, the solar-cell retainer 20 may seat, so that the outer perimeter sidewall 84 of the solar-cell retainer 20 is flush or substantially flush with the discontinuous upstanding perimeter side wall 30. Each solar-cell retainer 20 may be sized so as to overlap an associated solar cell 22, with the upper surface 78 of the solar-cell retainer 20 extending inwardly from the outer perimeter sidewall 84, to overlap and retain an associated solar cell 22. Preferably, the upper surface 78 of each solar-cell retainer 20 includes an inwardly-directed slope 86 to direct run-off precipitation onto an associated solar cell 22.

Whilst a specific embodiment of the solar-cell retainer 20 is shown and described herein, it will be appreciated that this is not limited to any particular design, configuration or embodiment. For example, the outer perimeter sidewall of the solar-cell retainer may not be flush or substantially flush with the discontinuous upstanding perimeter side wall, but instead extend outwardly acting as a cage around an associated solar cell. In addition, the inwardly-directed slope or parts thereof, may be flat and/or or outwardly directed Preferably, each solar-cell retainer 20 has a filter 88 for filtering rainwater running from an associated solar cell 22 to the modular rainwater collection area 36. Advantageously, the filter 88 prevents or limits debris from passing to the modular rainwater collection area 36. In this embodiment, the filter 88 is a castellated edge of the solar-cell retainer 20 at or adjacent to the inner perimeter sidewall 82. In use, the filter 88 rests on the surface of the associated solar cell 22.

It should be appreciated that the filter is not limited to any particular design, configuration or embodiment. For example, the filter may take the form of a mesh, a guard, webbing, a lattice or trellis arrangement, or may be a grill, a brush or bristles. Alternatively, the filter, whilst assisting in preventing or limiting debris from passing to the rainwater collector may be dispensed with. Furthermore, the filter may run along any or all of at least one edge of the solar-cell retainer.

In this embodiment, the associated solar cell 22 is clamped to the base 18 of each rainwater collector 14 by means of a clamping system. At least one panel clamp 90 rests on an edge of each solar cell 22. The or each panel clamp 90 is engaged with a solar-cell clamping bolt 92, bolted through an associated bolt hole in the base 18 and secured by a T-bar 94. Beneficially, this clamping system may also be used to secure the fixing rails 38 to the underside of the modular rainwater collection area 36.

It will be appreciated that other forms of clamping systems or attachment mechanism may be used, provided that the or each solar cell is secured to an associated rainwater collector. For example, the solar cell may instead be secured to the solar-cell retainer, rather than the base, or merely be pinned so as to fit securely between the base and the solar-cell retainer of a rainwater collector.

The upper surface 78 of the solar-cell retainer 20 has at least one conduit mount 96 extending laterally between the inner perimeter sidewall 82 and the outer perimeter sidewall 84 of the solar-cell retainer 20. Each conduit mount 96 is a shaped support which includes two conduit retainers 98 in side-by-side relationship running parallel to each other, so as to support at least two liquid conduits 100, or two parallel lengths of a single liquid conduit 100. Here, each solar-cell retainer 20 has four conduit mounts 96, each conduit mount 96 extending around at least part of an edge of the upper surface 78 of the solar-cell retainer 20, such that a major part of the upper surface 78 of the frame of the solar-cell retainer 20 may be used to engage at least two liquid conduits 100, or two parallel lengths of a single liquid conduit 100.

The modular solar-energy and rainwater collection apparatus may further include at least one liquid conduit 100 positively engaged with the conduit retainers 98 of the conduit mount 96 and supported by the rainwater collectors 14. The liquid conduit 100 may be connected to and fed by a water supply so as to enable liquid in the liquid conduit 100 to be solar heated.

Preferably, the liquid conduit 100 is adapted to absorb heat from solar rays and may be made from relatively thin, heat conductive material and coated with a heat absorbent surface coating, such as matte black coating, although the liquid conduit may be made of any pipe with any coating.

The or each liquid conduit 100 may be arranged so as to circulate around the edges of the rainwater collectors 14 and associated solar cells 22, as shown in the drawings, such that a substantial part of the surface area available to be exposed to solar rays and rainwater is covered by the at least one solar cell 22 and the at least one liquid conduit 100. Such an arrangement maximises the space available in the most efficient manner, although it will be appreciated that the or each liquid conduit 100 and the or each solar cell 22 may be arranged in any other configuration, whether or not a substantial part of the surface area available to be exposed is covered. Further, the modular solar-energy and rainwater collection apparatus may comprise one or more of the rainwater collectors having only an associated solar cell and/or one or more of the rainwater collectors having only a liquid conduit mounted thereon.

Preferably, the modular solar-energy and rainwater collection apparatus may include a rainwater accumulator 102, in liquid communication with the discharge aperture 72, for example, by means of a pipe 104, so as to collect and store accumulated runoff rainwater discharged from the modular rainwater collection area 36.

Typically, the liquid conduit is connected to the rainwater accumulator 102, preferably by means of a pipe 104'. Furthermore, a pump means may be provided to pump runoff rainwater from the rainwater accumulator 102 through the liquid conduit 100. However, the liquid conduit may instead be connected to an external water supply, such as the mains water supply. Additionally, and/or alternatively, there may be no pump means and liquid from the rainwater accumulator may flow under gravity to the liquid conduit.

The modular solar-energy and rainwater collection apparatus 10 may include a heated-water reservoir 106. Typically, the liquid conduit 100 is directly connected to the heated-water reservoir, via a pipe 104", and heated rainwater from the liquid conduit 100 may be directed to the heated-water reservoir 106.

It will be appreciated that the heated water reservoir 106 and rainwater accumulator 102 may be provided in a suitable form other than this. For example, the heated water reservoir and rainwater accumulator may be provided in a single unit. Furthermore, the heated-water reservoir may be connected to the rainwater accumulator directly and the rainwater accumulator may feed rainwater to the heated-water reservoir for heating by independent means. Additionally and/or alternatively, the modular solar-energy and rainwater collection apparatus may be supplemented by an external water supply, for example, a mains water supply, reservoir, or other water tanks.

The solar cells may convert solar energy into electricity and are therefore, capable of supplying electricity. The electricity supplied may be connected to the mains electricity supply, to which it may be sold, or to an independent electricity supply for powering a building to which the modular solar-energy and rainwater collection apparatus is mounted, or to any appliance where electricity is required. In addition, further means may be provided for creating electricity from the heat collected in the or each liquid conduit, for example by a steam powered generator.

Figure 5:
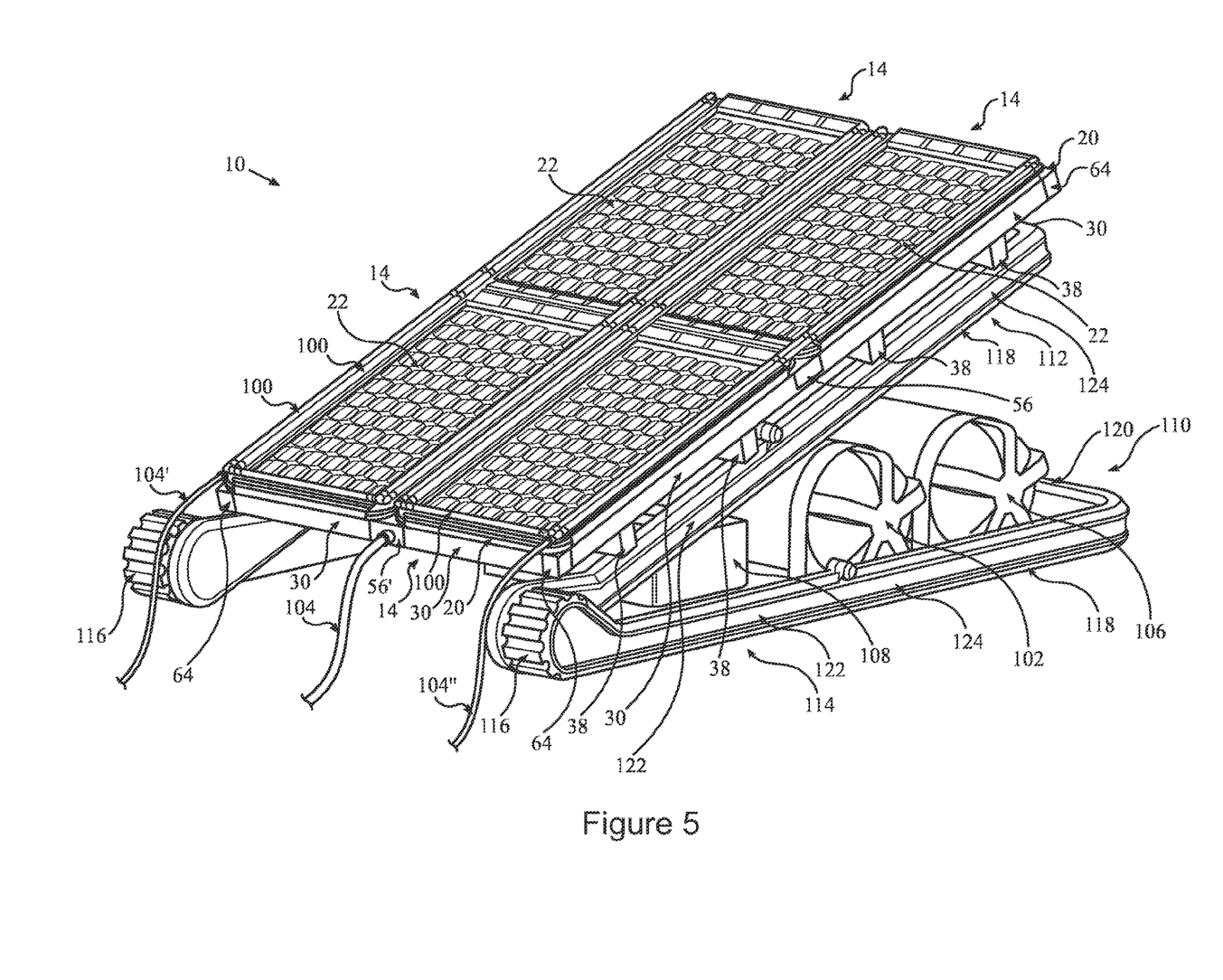
FIG. 5 shows a perspective view from above of the modular solar-energy and rainwater collection apparatus of FIG. 1, mounted on an angularly-adjustable support, in conjunction with a liquid conduit supported on the rainwater collector, and water outlet pipe connected to a discharge aperture.

The modular solar-energy and rainwater collection apparatus 10 may further include an electricity supply, such as a battery pack 108 illustrated in FIG. 5, for storing unused energy and to supplement the electricity provided by the solar cells, which may be used, for example, to heat water or to operate the pumping means.

In an alternative embodiment, the apparatus comprises a UV purification unit to case rainwater to be purified by the action of UV radiation.

The modular solar-energy and rainwater collection apparatus may include an angularly-adjustable support 110. The angularly-adjustable support 110 may have first and second elements 112, 114 with the first element 112 being adapted to engage with the collector mount 12 and the second element 114 being adapted for mounting on a support surface, as illustrated in FIG. 5.

Preferably, the first and second elements 112, 114 may, advantageously, be frames. The first and second elements 112, 114 may each be connected to at least one hinge joint 116, said at least one hinge joint thereby interconnecting the first and second element 112, 114. Each first and second element may each have at least one side arm 118 cantilevered from the at least one hinge joint 116. In this embodiment, each first and second element 112, 114 has two cantilevered side arms 118, each side arm 118 extending transversely from an associated indexed hinge 116, so as to positively retain a set angle between first and second elements 112, 114. Beneficially, the at least one indexed hinge 116, once set, thereby limits or prevents movement of the side arms 118, due to wind catching underneath the rainwater collectors 14, for example. A cross member 120 interconnects the free distal ends of the first and second side arms 118 of the respective first and second elements 112, 114 to form a frame.

Furthermore, each cantilevered arm 118 may be jointed to define first and second portions 122, 124, the first portion 122 being located proximal to the associated indexed hinge 116 and the second portion 124 located distally to the associated indexed hinge 116. Each cantilevered arm is jointed so as to enable folding of the second portion 124 over the first portion 124. Beneficially, this means the adjustable support 110 is foldable.

The angle at which at least one indexed hinge 116 is adaptable and thus, may be adjusted so that first and second elements 112, 114 are, or are substantially parallel. Preferably, the first element 112 may be dimensioned so as to seat inside the second element 114, when the indexed hinge 116 of the angularly-adjustable support 110 is adjusted so the first and second elements 112, 114 are, or are substantially, parallel, making the apparatus easily transportable. Furthermore, in use, the indexed hinge 116 of the angularly-adjustable support 110 may be modified to alter the angle or pitch of the rainwater collectors 14 and modular rainwater collection area 36. The angle between the first and second elements 112, 114 may also be altered so as accommodate one or both of the rainwater accumulator 102 and heated-water reservoir 106 therebetween. Further, the first and second elements 112, 114 may be adapted to house the battery pack 108, as illustrated in FIG. 5.

Whilst a specific embodiment of the angularly-adjustable support 110 is shown and described herein, it will be appreciated that this is not limited to any particular design, configuration or embodiment. For example the at least one indexed hinge may be a sprung pin and aperture, a ratchet catch, latch, or roller and pin system. In addition, whilst in FIG. 5, it is shown that each cantilevered side arm 118 of the first or second element 112, 114 is associated with a separate indexed hinge 116, there may instead be a single indexed hinge extending across the axis of the indexed hinges. Whilst the first and second elements 112, 114 are here depicted and described as frames, these may instead be, or be substantially, planar members, leaves, or plates for example. Further, while FIG. 5 illustrates that the angularly-adjustable support 110 rotates about a horizontal axis, it will be appreciated that the angularly-adjustable support may be arranged so that longitudinal rotation may also be achieved. In addition, two or more like angularly-adjustable supports may be adapted to be interconnectable, for example, by key and keyway connectors, thereby enabling daisy chaining.

Although pivoting in one plane is suggested, the apparatus may also include independent movement in a second plane, for example, by incorporating a rotatable mount for supporting the base 14. Additionally or alternatively, a further hinge or pivot may be included enabling articulable hinge adjustment of the orientation of the solar cells.

Furthermore, the or each hinge or rotational element may be motorised. If a controller is included, this may be programmed to track or substantially track the motion of the sun, whereby a positioning of the solar cells may be adjusted accordingly.

It is therefore possible to provide a modular solar-energy and rainwater collection apparatus which is both modular and transportable and capable of being easily and effectively deployed. The modular solar-energy and rainwater collection apparatus is capable of being used as a stand-alone unit for those living in developing countries, or for those living 'off the grid', i.e. for those who are disconnected from the electric grid and do not rely on the municipal water supply. The modular solar-energy and rainwater collection apparatus may also be quickly and efficiently deployed to disaster zones. Alternatively, the modular solar-energy and rainwater collection apparatus may be used in conjunction with existing mains electricity and water supplies in domestic environments, and may be attached directly to pitched roofs, or used with the angularly-adjustable support on flat roofs. The modular solar-energy and rainwater collection apparatus provides an effective and efficient way to harvest water from rain and related precipitation, as well as providing renewable energy, which may further be used to heat the recirculated harvested water.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention herein described and defined.

The invention claimed is:

1. A modular solar-energy and rainwater collection apparatus comprising:
   a collector mount;
   an angularly-adjustable support having a first frame adapted to engage the collector mount and a second frame adapted to mount on a support surface of a building, the first and second frames being hingably interconnected;
   a plurality of rainwater collectors supportable by the collector mount, each rainwater collector having:
   a base; and
   at least one solar-cell retainer, for securing at least one solar cell relative to the base of at least one said rainwater collector; and
   a connector for rigidly interconnecting a plurality of like rainwater collectors so that the bases are in abutted liquid communication with each other thus forming a modular rainwater collection area; the apparatus further comprising
   at least one liquid conduit supported by the rainwater collectors, the said at least one liquid conduit being positively engaged with the said at least one solar-cell retainer;
   a rainwater accumulator adapted to store accumulated runoff rainwater discharged from the modular rainwater collection area, the said at least one liquid conduit being in liquid communication with the rainwater accumulator;
   a pump adapted to pump runoff rainwater from the rainwater accumulator through the said at least one liquid conduit; and
   a heated-water reservoir for receiving runoff water which is heated when pumped through the liquid conduit supported by the rainwater collectors; wherein the first and second frames are adapted to house the rainwater accumulator and the heated-water reservoir therebetween.

2. A modular solar-energy and rainwater collection apparatus as claimed in claim 1, wherein each rainwater collector has a discontinuous upstanding perimeter side wall.

3. A modular solar-energy and rainwater collection apparatus as claimed in claim 2, wherein the base and the discontinuous upstanding perimeter side wall of each rainwater collector forms a tray, each tray having a continuous base for the or each associated solar cell to lie thereon.

4. A modular solar-energy and rainwater collection apparatus as claimed in claim 1, further comprising at least one of the following: the connector including at least one bridging infill element which interconnects at least parts of neighbouring side walls of two abutted rainwater collectors; and at least one corner infill element having a first wall connector part at each end portion of the corner infill element for engaging complementary second wall connector parts on the discontinuous upstanding perimeter side wall of each rainwater collector.

5. A modular solar-energy and rainwater collection apparatus as claimed in claim 4, wherein the bridging infill element is a planar or substantially planar member having a first bridging connector part at each end portion of the planar member for engaging complementary second bridging connector parts on the neighbouring side walls of abutted rainwater collectors.

6. A modular solar-energy and rainwater collection apparatus as claimed in claim 4, wherein the at least one bridging infill element and/or the at least one corner infill element complete a perimeter boundary of the modular rainwater collection area.

7. A modular solar-energy and rainwater collection apparatus as claimed in claim 4, wherein the corner infill elements define vertices of the modular solar-energy and rainwater collection apparatus.

8. A modular solar-energy and rainwater collection apparatus as claimed in claim 4, wherein at least one said bridging infill element and/or corner infill element includes a discharge aperture for the discharge of runoff precipitation accumulated on the modular rainwater collection area.

9. A modular solar-energy and rainwater collection apparatus as claimed in claim 1, further comprising at least one of the following: at least one solar-cell support for supporting the or each solar cell in a spaced apart relationship with the base of an associated rainwater collector; and a UV purification device arranged to purify the rainwater collected by the apparatus by UV radiation.

10. A modular solar-energy and rainwater collection apparatus as claimed in claim 1, further comprising at least one of the following: the solar-cell retainer being a solar-cell frame, overlapping the or each associated solar-cell and engageable with the base of the rainwater collector; an upper surface of the solar-cell retainer including an inwardly-directed slope for runoff precipitation onto an associated solar cell; and the solar-cell retainer including a filter for filtering rainwater running from the or each associated solar cell to the modular rainwater collection area.

11. A modular solar-energy and rainwater collection apparatus as claimed in claim 10, wherein the filter is a castellated edge of the solar-cell retainer.

12. A modular solar-energy and rainwater collection apparatus as claimed in claim 10, wherein the upper surface of the solar-cell retainer includes at least one conduit mount for positively engaging the at least one liquid conduit, wherein each conduit mount includes two conduit retainers for positively engaging two liquid conduits in side-by-side relationship, the conduit mount extending laterally between an inner perimeter sidewall and an outer perimeter sidewall of the solar-cell retainer.

\* \* \* \* \*